United States Patent Office 2,775,556
Patented Dec. 25, 1956

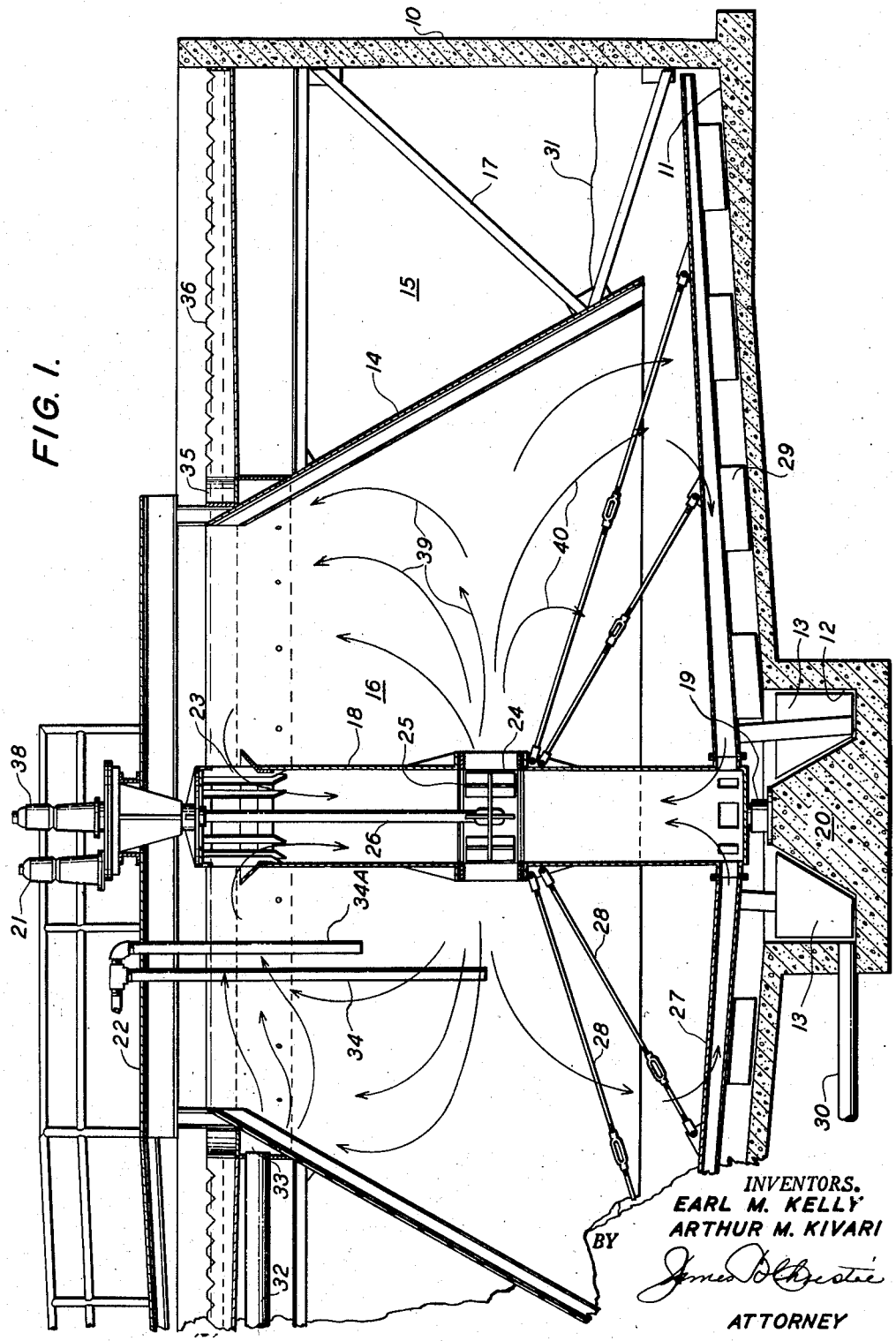

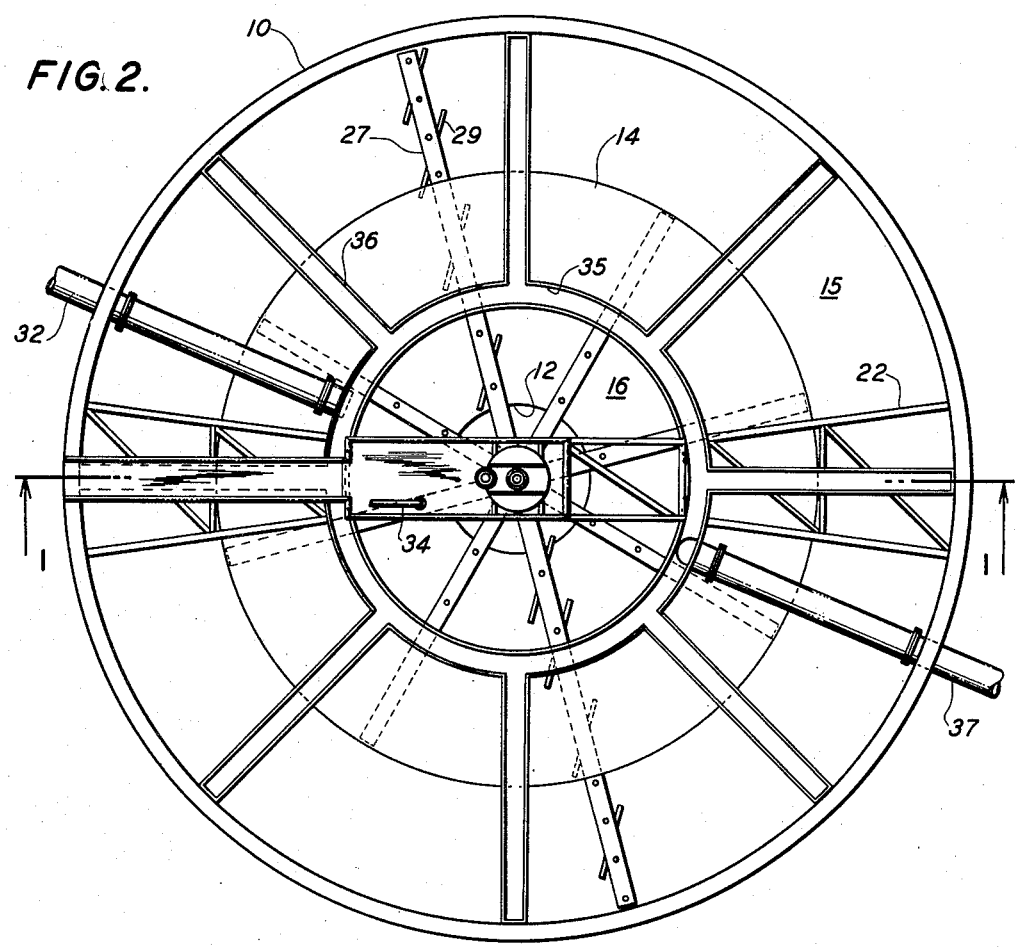

2,775,556
APPARATUS AND METHOD FOR LIQUID TREATMENT AND CLARIFICATION

Earl M. Kelly, Hillsborough, and Arthur M. Kivari, Los Angeles, Calif., assignors to Process Engineers Incorporated, San Francisco, Calif., a corporation of California Application February 16, 1953, Serial No. 337,082

6 Claims. (Cl. 210—16)

This invention relates to clarification of liquids by settlement of entrained solids and provides improved apparatus and methods for such clarification. The invention is concerned particularly with water clarification, especially by the sludge blanket method, but it has general utility and may be employed in the removal of chemical precipitates from non-aqueous solutions, in sewage treatment, water softening, etc.

In water-softening treatment, reagents are customarily added to the raw water to form insoluble compounds with undesirable elements, thereby precipitating them from the solution. After such treatment, a troublesome murkiness caused by very finely divided particles of precipitate often remains. One of the most satisfactory and economical methods for the removal of these particles is to pass the water to be clarified upward through a blanket of sludge of the precipitate itself. This sludge provides nuclei which attract the finer particles, and these together form larger flocs which easily separate from the treated water. The sludge blanket is supported by adjusting the linear velocity of the water so that the forces tending to settle the sludge are nearly balanced by those which tend to carry it along with the clarified water.

Prior devices for sludge blanket clarification have not provided an optimum environment for removal of finely divided precipitates. Inherently insufficient means for mixing reagents and raw water have required extended residence periods. Effective means have been lacking to bring raw water and reagents quickly into contact with the precipitate floc to enable early formation of heavy flocs. The formation of such heavy flocs is desirable since they separate from the solution at once and impose no filtration load on the sludge blanket. The older devices have introduced the raw water in short circuit providing poor mixing in only one reaction zone. Impellers or propellers have been centrally located in a system without collecting means, leaving dead zones of insufficient circulation. To avoid these dead zones, some prior devices have gone so far as to fill them in with concrete, thereby complicating the structure and reducing the capacity of the system. Short effluent weirs have caused high linear rates of discharge which tend to disturb the interface between sludge blanket and clarified water. The combination of the above objections, among others, has prevented full realization of the potentialities of the sludge blanket clarifier.

The present invention provides apparatus achieving a faster and more complete separation of treated waters from undesirable constitutents. It is particularly adapted to high rate clarification and permits much higher throughput per unit area per unit time. Principal improvements over prior designs include the introduction of raw water around the periphery of an upper reaction zone. A unique circulating column provides for two distinct reaction zones which circulate at different rates and converge inside the column, interchanging components to the advantage of both. After reaction is completed and the water passes through a conventional sludge blanket, effluent weirs of original design are provided to allow low linear discharge velocities. The combination of these new features as set forth below produces water markedly clearer than obtainable with conventional apparatus and at a faster rate.

The apparatus of our invention contemplates a tank having two compartments, one disposed around the other and separated by a baffle which extends above the liquid level of a pool of liquid undergoing treatment in the two compartments, with the two compartments communicating with each other underneath the baffle. The liquid, say hard water to be softened, is introduced into the inner compartment near the top through a ring manifold disposed adjacent the baffle, the liquid entering the inner compartment at several points around its periphery. If a reagent is introduced, it is preferably run into the inner compartment at more than one point below the points of entrance of the liquid. Means are provided in the inner compartment for creating two circulations. Thus liquid from the top of the compartment is drawn into a conduit in the compartment and carried down and forced out into the pool at an intermediate level. Liquid and solids from the bottom of the compartment, in the zone in which sludge tends to settle, are drawn up through a conduit and discharged into the pool in the inner compartment with the liquid drawn in from the top portion. Thus the two circulations are established with an intermingling of the liquid in the two circuits at an intermediate level in the tank.

Ordinarily a sludge blanket is retained, at least in the bottom of the outer compartment to a level above the bottom of the baffle. Liquid passing to overflow in the outer compartment works its way under the baffle, up through the blanket and finally overflows at low velocity out a very long effluent weir. This weir is disposed at the top of the outer compartment and in its preferred form comprises a large number of notched radial weirs connected adjacent the baffile by an annular notched weir. From the overflow weir the clarified effluent is removed in a conventional conduit.

Solids settled in the bottom of both compartments are moved to a sludge outlet, say a sludge pit, by conventional means, say rakes.

Our invention will be understood thoroughly in the light of the accompanying detailed description of presently preferred practice illustrated by the drawings in which:

Fig. 1 is a fragmentary elevation, partly in section, of a presently preferred form of the apparatus of the invention; and Fig. 2 is a plan of the apparatus of Fig. 1. Like members in the drawings bear the same numbers.

The apparatus comprises a large cylindrical tank 10. It has a gently sloping bottom 11 in the shape of an inverted frustum of a cone which converges to a centrally located sludge pit 12 at the center. Scraper blades 13 operate in the sludge pit to prevent caking of the sludge and to expedite its removal. The tank contains a pool of the liquid to be treated and clarified.

A frusto conical baffle 14 is disposed centrally in the tank and projects upward above the liquid level and downward to a level near the bottom. It divides the tank into an outer annular compartment 15 and an inner compartment 16 which communicate with each other solely under the baffle. The baffle is supported in the tank by trusses 17 attached to the tank side and disposed in the outer compartment.

An upright hollow circulating column 18 is disposed at the center of the tank and has a guide bearing 19 located on top of a central pier 20 in the sludge pit. The column extends above the liquid level in the tank and is rotated by and supported from a conventional drive mechanism 21. This mechanism is mounted on a superstructure 22 consisting of beams extending diametrically across the top of the baffle and resting upon it.

The circulating column has upper ports 23 at the liquid surface to allow the liquid to flow into and down the column. Middle ports 24 are disposed at an intermediate location in the column and adjacent to a circulating propeller 25 which causes expulsion of liquid from the column into the inner compartment of the tank. This propeller is rotated by a central shaft 26 which is driven by a conventional drive mechanism 38 mounted on the superstructure. Hollow perforated radial arm 27 of varying length are attached to the bottom of the column and supported by tension rods 28. These hollow arms are also connected with the circulating column for fluid flow which passes into the arms through the perforations, and from there into the circulating column. The circulating propeller draws the sludge (a mixture of liquids and solids) upward to the mid ports where it is expelled into the inner compartment. Two of the longer arms have scraper blades 29 mounted at a slant to the arms so that rotation of the circulating column and the attached arms will cause the settled precipitate to be raked to the central sludge pit, where it is removed at the rate of formation via a sludge pipe 30, with the aid of the scrapers 13.

A sludge blanket level 31 is maintained, by adjustment of flow rates, in the outer compartment at a level above the bottom of the baffle. Liquid to be clarified is supplied by an influent pipe 32 to an annular influent manifold 33 disposed just beneath the surface of the inner compartment. Reagents are added by means of conduits 34, 34A, which extend to various depths in the pool below the inlet manifold. Preferably one of the conduits discharges just below the level of the manifold and the other discharge at about the level of the impeller.

Clarified water is drawn off by effluent weirs at the surface of the outer compartment. These weirs, as shown in Fig. 2, are comprised of an annulus 35 with radial spokes 36, all notched for inflow, and connected to an effluent pipe 37.

The water or other liquid to be treated and reagents are introduced through the manifolds to the circulation of an upper primary reaction zone which circulates as indicated by arrows 39. They are drawn through the upper ports into the center of the circulating column and downward toward the circulating propeller. During this period, the reagents have begun their reaction with undesirable elements to form precipitates. In a lower secondary reaction zone which circulates as indicated by arrows 40 the circulation is upward in the column and downward in the pool. In this zone, water and some settling flocs of precipitate, or sludge, are drawn through the radial arms to the inside of the circulating column, then upward to the circulating propeller. At this point, the streams from the two zones converge at the circulating propelller before being impelled into the reaction zones through the middle ports. Some o the lighter flocs are taken into the primary zone, where they act as nuclei which accelerate the precipitation of finely divided particles. The heavier flocs from both primary and secondary zones go into the secondary zone, where most of them settle to the bottom. The rate of circulation in the primary zone is relatively rapid, being approximately four times the rate of influent supply, to provide for rapid and thorough mixing. The secondary zone circulates more slowly, about twice influent supply rate. This allows the gentle movement which encourages formation of large flocs and permits settling. Our investigations have shown that superior results are obtained by providing these two converging zones. The presence of nuclei during the formation of precipitates results in larger floc formation, quicker reaction, and better clarification. The circulating column and the radial arms attached to it are slowly rotated, drawing fluid from all parts of the secondary reaction zone, and effectively precludes the existence of dead zones of insufficient circulation.

Since the inner and outer compartments are connected under the baffle, effluent flow, and flow under the baffle are governed by influent rate. When the desired residence time is calculated and the pool volume known, the influent rate may be ascertained. After circulation in the reaction zones, liquid escapes from the secondary reaction zone under the baffle where it passes upward through the blanket of sludge. This sludge blanket is maintained in the outer compartment at any desired level above the lower edge of the baffle by adjusting the flow rate such that the forces tending to carry the blanket along the stream are nearly balanced by those tending to settle it. This sludge blanket provides further nuclei for the agglomeration or adsorption of the remaining finely divided particles of precipitate. Since the baffle narrows inwardly toward the center as it rises, the water in the outer compartment encounters an increasing cross section and its linear rate upward diminishes. This lessening velocity permits the maintenance of the sludge blanket by providing a supporting velocity in the lower section, and a velocity insufficient to support the precipitates in the upper section. The sludge which settles from the secondary reaction zone along with that which settles from the blanket is withdrawn at the rate of formation from the bottom of the tank where it is raked by the scrapers toward the sludge pit in a spiral path. After the water has passed through the sludge blanket and risen to the top, it overflows into weirs at the surface. It is important that these weirs have as long a length as possible in order that the clarified water have a low velocity over the weir.

In conventional water softening or clarification equipment, the flow rate required in order to secure a clear effluent is ordinarily in the range of 600 to 1200 gallons per 24 hours per square foot of pool area. With the apparatus of the invention this rate can be increased to the range of 1500 to 3000 gallons per 24 hours per square foot of pool area without loss in clarification. At such a rate the apparatus of the invention will handle liquids having a turbidity ranging from 100 p. m. m. to several thousand p. m. m. at the high flow rates and still give less than 10 p. m. m. turbidity in the effluent.

The apparatus of the invention can be employed as a straight clarifier for turbid liquids, say turbid water in a municipal water system or as a combination clarifier and reactor, as in water softening employing lime and soda ash as precipitants for hardness. In either case the retention time in the inner compartment will be about ½ to ¾ of an hour and 1 to 2 hours in the outer compartment. Reagent consumption, when reagents are employed, is no different than in conventional equipment.

We claim:

1. In clarification apparatus including a tank for holding a pool of liquid to be clarified and in which solids settle to the bottom, and an annular baffle spaced from the wall of the tank and from the bottom and extending both above and below the level of the pool, the combination which comprises an annular manifold disposed in the tank adjacent the upper edge of the baffle for admitting liquid to be clarified to the periphery of the pool within the baffle at a plurality of points around the baffle, pumping means disposed in the tank inside the baffle for circulating the liquid up and down between an upper portion of the pool and an intermediate portion of the pool within the baffle and for circulating liquid and solids up and down between the intermediate portion of the pool and a lower portion of the pool, means for removing settled solids from the bottom, and radial effluent weirs disposed at the level of the pool in the tank outside the baffle for removing clarified effluent liquid from the pool.

2. In clarification apparatus including a tank for holding a pool of liquid to be clarified and in which solids settle to the bottom, the combination which comprises an annular baffle sloping outward toward the bottom spaced from the wall of the tank and from the bottom and extending both above and below the level of the pool, an annular manifold disposed in the tank adjacent the upper edge of and the inner side of the baffle for admitting liquid to be clarified to the periphery of the pool within the baffle, pumping means disposed in the tank inside the baffle for circulating the liquid up and down between an upper portion of the pool and an intermediate portion of the pool within the baffle and for circulating liquid and solids up and down between the intermediate portion of the pool and a lower portion of the pool, means for removing settled solids from the bottom, and radial effluent weirs disposed at the level of the pool in the tank outside the baffle for removing clarified effluent liquid from the pool.

3. Apparatus according to claim 2 in which the pumping means comprises an upwardly extending hollow shaft having openings respectively near the top and bottom of the pool and at a location between the ends of the shaft, and a circulation means disposed at the latter opening for drawing liquid and solids into each end of the shaft for ejection from the latter opening into the pool.

4. Apparatus according to claim 2 in which the pumping means comprises a rotatable vertical hollow shaft containing openings respectively near the top and at a location between ends of the shaft, a circulation means at the latter opening for ejection of liquid and solids from the shaft into the pool, and at least one radial tubular arm rigidly affixed to the shaft near its bottom end and containing a longitudinal passageway and perforations in the wall of the arm, the passageways and perforations providing a liquid conduit from the pool to the inside of the shaft.

5. Apparatus according to claim 2 in which the pumping means comprises a rotatable vertical hollow shaft containing openings near the top and at a location between the ends of the shaft, a circulation means at the latter openings for ejection of liquid and solids from the shaft into the pool, and a plurality of tubular arms rigidly affixed to the shaft near its bottom end of relatively short and relatively long length each containing a longitudinal passageway and perforations in the wall of the arms, the passageways and perforations providing a liquid conduit from the pool to the inside of the shaft, there being affixed to the relatively longer arms a plurality of means for scraping the bottom of the pool.

6. Apparatus according to claim 2 in which the pumping means comprises a rotatable vertical hollow shaft containing openings near the top and at a location between the ends of the shaft, a circulation means at the latter openings for ejection of liquid and solids from the shaft into the pool, and a plurality of radial tubular arms rigidly affixed to the shaft near its bottom end of relatively short and relatively long length each containing a longitudinal passageway and perforations providing a liquid conduit from the pool to the inside of the shaft, there being affixed to the relatively longer arms a plurality of means for scraping the bottom of the pool, and the radial effluent weirs for inflow of effluent liquid comprise a trough of annular shape with a plurality of radially extending troughs all interconnected for liquid transmission to a means for collection of the effluent liquid.

References Cited in the file of this patent

UNITED STATES PATENTS

| | | |
|---|---|---|
| 2,127,314 | Spaulding | Aug. 16, 1938 |
| 2,245,587 | Hughes | June 17, 1941 |
| 2,364,023 | Green | Nov. 28, 1944 |
| 2,404,701 | Felsecker | July 23, 1946 |
| 2,411,390 | Prager | Nov. 19, 1946 |
| 2,425,372 | Green | Aug. 12, 1947 |
| 2,483,706 | Lind | Oct. 4, 1949 |
| 2,527,788 | Bieker et al. | Oct. 31, 1950 |
| 2,573,941 | Walker et al. | Nov. 6, 1951 |
| 2,647,869 | Kelly | Aug. 4, 1953 |
| 2,649,412 | Kivari et al. | Aug. 18, 1953 |
| 2,678,916 | Kalinske | May 18, 1954 |

FOREIGN PATENTS

| | | |
|---|---|---|
| 167,504 | Great Britain | July 27, 1922 |